United States Patent [19]

Steinhage

[11] 4,322,620
[45] Mar. 30, 1982

[54] CAMERA TUBE FOR THERMAL IMAGING

[75] Inventor: Peter-Wilhelm Steinhage, Wiesbaden, Fed. Rep. of Germany

[73] Assignee: Heimann GmbH, Wiesbaden, Fed. Rep. of Germany

[21] Appl. No.: 137,278

[22] Filed: Apr. 4, 1980

[30] Foreign Application Priority Data

May 30, 1979 [DE] Fed. Rep. of Germany ....... 2922056

[51] Int. Cl.³ .......................................... H01J 31/50
[52] U.S. Cl. .................................... 250/333; 250/330
[58] Field of Search ............... 250/330, 333; 313/101, 313/388

[56] References Cited

U.S. PATENT DOCUMENTS 3,774,043 11/1973 Le Carvennec .................... 250/330

OTHER PUBLICATIONS

Watton et al., "Performance of the Pyroelectric Vidicon for Thermal Imaging in the 8-14 Micron Band", IEEE Trans. on Electron Devices, 21 (8), Aug. 1974, pp. 462-469.

Primary Examiner—Alfred E. Smith
Assistant Examiner—Carolyn E. Fields
Attorney, Agent, or Firm—Hill, Van Santen, Steadman, Chiara & Simpson

[57] ABSTRACT

A camera tube for thermal imaging is disclosed comprising an entrance window of an electrically conductive material, a target for converting the thermal image, and an electron beam system for scanning the target. Incident thermal radiation is modulated by means of a mechanical chopper functioning as a modulator directly in front of the entrance window. The entrance window is electrically isolated from the target and is preferably grounded. By so doing, the target is shielded against electrical influences due to the modulator.

6 Claims, 1 Drawing Figure

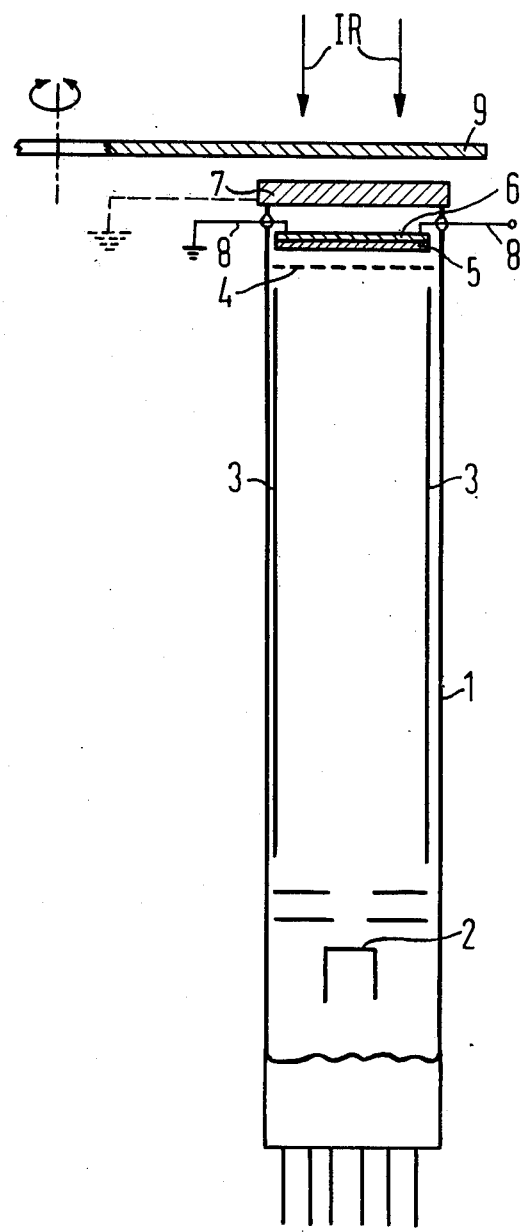

CAMERA TUBE FOR THERMAL IMAGING

BACKGROUND OF THE INVENTION

The invention relates to a camera tube for thermal imaging and having an entrance window consisting of an electrically conductive material, a target for converting thermal images, and an electron beam system for scanning the target. A mechanically moved thermal radiation modulator is arranged in front of the entrance window.

In a camera tube for thermal imaging with an insulated target, as is the case, for example in a pyroelectric camera tube, the incident heat radiation is periodically chopped by means of a mechanical modulator. This is required for good image resolution and for producing stationary images. Normally, the modulator consists of a periodically rotating shutter with a light period and a dark period. It is situated right in front of the entrance window of the camera tube for thermal imaging.

Such an arrangement is known and described, for example, in U.S. Pat. No. 3,774,043, incorporated herein by reference. The entrance window consists of an insulating material and exhibits an electrically conductive layer on the inside which is electrically connected to a signal electrode layer on the pyroelectric target.

It is likewise known, for example, from the periodical "IEEE Transactions on Electron Devices", Vol. ED-21, No. 8, Aug. 1974, Pages 462-469, incorporated herein by reference, to make the entrance window of germanium for thermal rays of from 8 to 14 μm wavelength. The target is mounted behind and on the entrance window in an electrically conductive connection. The germanium is itself likewise electrically conductive. Silicon, which is likewise electrically conductive, is employed for smaller wavelengths in the so-called second atmospheric window.

In operation, capacitive image disruptions are produced on the signal electrode via these conductive entrance windows from the modulator positioned right in front of the window. Arrangements can be obtained in which openmeshed, monofil or single filament grids for electrical screening or shielding are provided between the entrance window and the modulator in order to prevent such pick-ups. The scatter and absorption at such grids, however, diminish good image quality.

SUMMARY OF THE INVENTION

An object of the present invention is to prevent the electrical influence of the modulator on the target and the signal electrode without deteriorating the optical properties.

For achieving this object, according to the invention in a camera tube for thermal imaging of the type initially described, the entrance window is electrically separated from the target in order to screen the target from the thermal radiation modulator.

Electrical grounding of the entrance window is advantageous.

Accordingly, the entrance window preferably consists of germanium or silicon, or of a non-conductive material which is covered with an electrically conductive layer permeable to radiation.

In the inventive arrangement, the entrance window itself effects an electric screening or shielding of the target from the moving modulator. By so doing, the target is not optically influenced.

BRIEF DESCRIPTION OF THE DRAWING

The arrangement of the invention is schematically illustrated in the drawing.

DESCRIPTION OF THE PREFERRED EMBODIMENTS

A camera tube for thermal imaging has a glass bulb 1, an electron beam generating system 2 on the inside at one end, an electron beam system 3 in the longitudinal path of the tube, and an anode grid 4 at the other end. A pyroelectric target 5 consisting, for example, of triglycinesulfate, lies in front of grid 4 and has a signal electrode 6 with electrical connection 8 at its front side. The front end of the picture tube for thermal imaging has an entrance window 7 of germanium through which the thermal radiation referenced IR can reach the target 5. A modulating shutter 9, which periodically fades the thermal radiation in and out by means of rotation, lies between the thermal radiation source and the entrance window 7 at a location directly in front of the window 7.

Window 7 preferably is comprised of germanium or silicon. Alternatively, a non-conductive material may be provided which is covered with an electrically conductive layer permeable to radiation.

The entrance window 7 is connected to ground potential and is electrically separated from the target 5, from the signal electrode 6, as well as from the feed line 8. By so doing, no topical electrical charges caused by the modulator motion can build up in the entrance window 7. A capacitive coupling of the modulator motion onto the target 5 is thus suppressed.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A camera tube for thermal imaging wherein a mechanically moving thermal radiation modulator is arranged in front of an entrance window of the camera tube, comprising: an envelope; an entrance window at one end of the envelope and having an electrically conductive material; target means adjacent the entrance window for converting the thermal image; an electron beam means in the envelope for scanning the target means; and the entrance window being electrically isolated from the target means so as to electrically shield the target means from the moving thermal radiation modulator.

2. A camera tube for thermal imaging according to claim 1 wherein the entrance window conductive material is grounded.

3. A camera tube for thermal imaging according to claim 1 wherein the entrance window comprises germanium.

4. A camera tube for thermal imaging according to claim 1 wherein the entrance window comprises silicon.

5. A camera tube for thermal imaging according to claim 1 wherein the entrance window comprises a non-conductive material covered by an electrically conductive radiation permeable layer.

6. A camera tube for thermal imaging wherein a mechanically moving thermal radiation modulator is arranged in front of an entrance window of the camera tube, comprising: an envelope; an entrance window at one end of the envelope comprising an electrically conductive material; target means within the envelope adjacent the entrance window for creating the thermal images; means in the envelope for producing an electron beam to scan the target means; and the entrance window being electrically isolated from the target means and positioned so as to electrically shield the target means from capacitive effects which the moving portion of the modulator would otherwise have on the target means.

* * * * *